US006615494B2

(12) United States Patent
Long et al.

(10) Patent No.: US 6,615,494 B2
(45) Date of Patent: Sep. 9, 2003

(54) BONING AND DEFATTING ROTARY KNIFE

(76) Inventors: John W. Long, 1003 S. 24th St., Omaha, NE (US) 68108; Dale R. Ross, 425 Liberty Dr., McPherson, KS (US) 67460

( * ) Notice: Subject to any disclaimer, the term of this patent is extended or adjusted under 35 U.S.C. 154(b) by 0 days.

(21) Appl. No.: 10/050,412

(22) Filed: Jan. 15, 2002

(65) Prior Publication Data

US 2003/0131482 A1 Jul. 17, 2003

(51) Int. Cl.[7] ............................................. A22C 17/04
(52) U.S. Cl. .......................... 30/276; 30/283; 30/138; 30/293; 30/347
(58) Field of Search ........................ 30/276, 346, 329, 30/347, 282, 283, 123, 138, 293; 452/133, 134

(56) References Cited

U.S. PATENT DOCUMENTS

| | | | | |
|---|---|---|---|---|
| 4,494,311 A | * | 1/1985 | McCullough | 30/276 |
| 4,854,046 A | * | 8/1989 | Decker et al. | 30/276 |
| 4,858,321 A | * | 8/1989 | McCullough | 30/276 |
| 5,522,142 A | * | 6/1996 | Whited | 30/276 |
| 5,664,332 A | * | 9/1997 | Whited et al. | 30/276 |
| 5,761,817 A | * | 6/1998 | Whited et al. | 30/276 |

* cited by examiner

*Primary Examiner*—Hwei-Siu Payer
(74) *Attorney, Agent, or Firm*—Adam H. Jacobs (57) ABSTRACT

A boning and defatting knife includes a blade support unit including a handle, a blade support ring connected to and extending from the handle and a drive shaft mounted on at least one of the handle and the blade support ring. The knife further includes a blade unit having a generally toroidal blade engaging and locking device having a drive means engaging section and a releasable fastening and locking section and a generally toroidal blade having an outer locking edge and an inner cutting edge. The releasable fastening and locking section of the blade engaging and locking device is operative to releasably receive and lock the outer locking edge of the blade thereon, whereby the blade is removable and replaceable and the blade unit is adapted to be removably and rotatably seated on the blade support ring with the drive device engaging the drive device engaging section of the blade unit such that the blade unit is rotated within the blade support ring by the drive device.

15 Claims, 8 Drawing Sheets

BONING AND DEFATTING ROTARY KNIFE

BACKGROUND OF THE INVENTION

1. Technical Field

The present invention is directed to rotary defatting knives and, more particularly, to an improved rotary defatting knife and generally toroidal blades used therewith in which the blades are quickly and easily interchangeable, the drive shaft and blade are mounted on ball bearings and the combination of features acts to reduce vibrations and improve performance of the knife.

2. Description of the Prior Art

The meat packing and processing industry has become increasingly important as the world population continues to grow thereby increasing the need for meat and meat products. As a result of the increased demand for meat, the meat packing industry had to become more efficient in its meat processing and packing operations. Through the use of improved technology and "assembly-line" like operations, the meat industry has been able to increase the production of meat and meat products. However, the industry requires individuals to use some form of knife to remove bones and trim the excess fat from the meat. Accordingly, the meat packing industry has attempted to produce knives that allow the user to debone and trim meat faster, safer, and more economically; a long-felt-need which has yet to be fully addressed.

The prior art discloses knives that typically have a handle, a drive mechanism, and a blade. Although there are numerous types of powered knives which are used, one of the more commonly used types includes a circular blade which rotates at a high rate of speed, the blade being rotatably supported on a handle. These knives are used to remove and trim fat from the carcass by "planing" the knife over the area on the carcass which is being trimmed and the spinning of the blade cuts the tissue being contacted to remove a strip from the carcass. It has been found that these types of blades are very efficient at removing tissue from the carcass, but there are inherent problems with the use of these knives that have not been solved by the prior art.

As with any knife, eventually the cutting edge of the circular blade of the knife becomes dull. This is especially true in the meat packing industry as the knives are used to cut through tough skin and sinew of the carcass. When an ordinary knife edge becomes dull, the user would merely sharpen the blade of the knife. However, with a circular blade, the sharpening process is much more involved, and in the case of the types of circular blades used in the meat industry, it is often necessary to send the blade to the producing company for sharpening. Alternatively, the blade would be removed and replaced with a new blade. In the prior art, in order to change the blade, the knife would have to be replaced, as with the one-piece knife, or all the numerous screws or bolts would have to be removed. This invention solves the long-felt-need in the industry allowing the operator to change out a dull blade quickly and easily without unfastening large numbers of screws or bolts or replacing the entire knife.

In the case of the one-piece knife, the blade cannot be changed out at all. The blade, handle, and blade support ring are all one piece and therefore cannot be disassembled to change out the blade. The operator would have to use a new knife with a sharp blade to cut through the meat and fat of the carcass. While an operator can change knives relatively quickly, it is expensive to replace an entire knife for a sharp blade.

Another prior art reference embodies a knife that has a blade that is attached to the blade support ring via a plurality of screws or bolts. This embodiment allows the operator to change the dull blade but only after the entire blade support unit is unscrewed and disassembled and a new blade is reassembled with the knife. This procedure, while potentially less expensive than the above example, is time consuming. The operator must take the time to disassemble the entire knife, a process that can take anywhere from five minutes to twenty minutes, replace the blade, and reassemble the entire knife unit with the new blade intact. The increased demand for meat requires this process to occur more frequently resulting in more time that is wasted replacing blades then less time spent deboning and defatting meat. Therefore, there is a need for a knife that has a quick and easy interchangeable blade.

Another problem in the meat packing industry, not solved by the prior art, is the large amount of vibration and noise emitted by the rotary knives. The nature of the meat packing industry requires the blades to rotate at extremely high-speeds. To achieve the required speeds, knives of the prior art incorporate a drive mechanism consisting of a drive shaft and a gear which are composed of metal. The drive shaft would engage the gear and both the shaft and gear would spin to rotate the blade which is also made of metal along with the blade support ring. As a result, the metal-on-metal contact of the knife components operating at high-speeds would cause a high-pitched noise that could damage the eardrum and impair hearing. Additionally, the lack of a damper in the drive mechanism and high-speed operation causes severe vibration of the knife that could result in loss of control of the knife and injury to the user. There is therefore a need for a knife that has a quickly and easily replaceable blade assembly and which also reduces noise and vibration.

Therefore, an object of the present invention is to provide an improved boning and defatting rotary knife.

Another object of the present invention is to provide a knife that has an interchangeable blade assembly that allows the blade to be replaced quickly and easily.

Another object of the present invention is to provide an improved boning and defatting rotary knife that significantly reduces vibration and noise produced by the knife.

Finally, it is an object of the present invention to provide an improved boning and defatting rotary knife which is relatively simple to manufacture and is safe and efficient in use.

SUMMARY OF THE INVENTION

The present invention is directed to a boning and defatting knife having a blade support unit including a handle, a blade support ring connected to and extending from the handle and a drive shaft mounted on at least one of the handle and the blade support ring. The knife further includes a blade unit having a generally toroidal blade engaging and locking device having a drive means engaging section and a releasable fastening and locking section and a generally toroidal blade having an outer locking edge and an inner cutting edge. The releasable fastening and locking section of the blade engaging and locking device is operative to releasably receive and lock the outer locking edge of the blade thereon, whereby the blade is removable and replaceable and the blade unit is adapted to be removably and rotatably seated on the blade support ring with the drive device engaging the drive device engaging section of the blade unit such that the blade unit is rotated within the blade support ring by the drive device.

The present invention as thus described has many advantages over those devices found in the prior art. The blade engaging and locking device is designed to receive and secure the blade therewithin and also allow the operator to quickly and easily replace the blade. Furthermore, the construction materials used in connection with the blade engaging and locking device substantially reduce the high-pitched noise emitted from the knife during its operation, thereby decreasing the risk of hearing impairment. Additionally, the inclusion of ball bearings in the device reduces knife vibration during its operation. Finally, the combination of features found on the present invention render the invention far more efficient and safe for use than those devices found in the prior art. Therefore, the present invention is seen to provide substantial improvements over those devices found in the prior art.

DESCRIPTION OF THE PREFERRED EMBODIMENT

Figure 1:
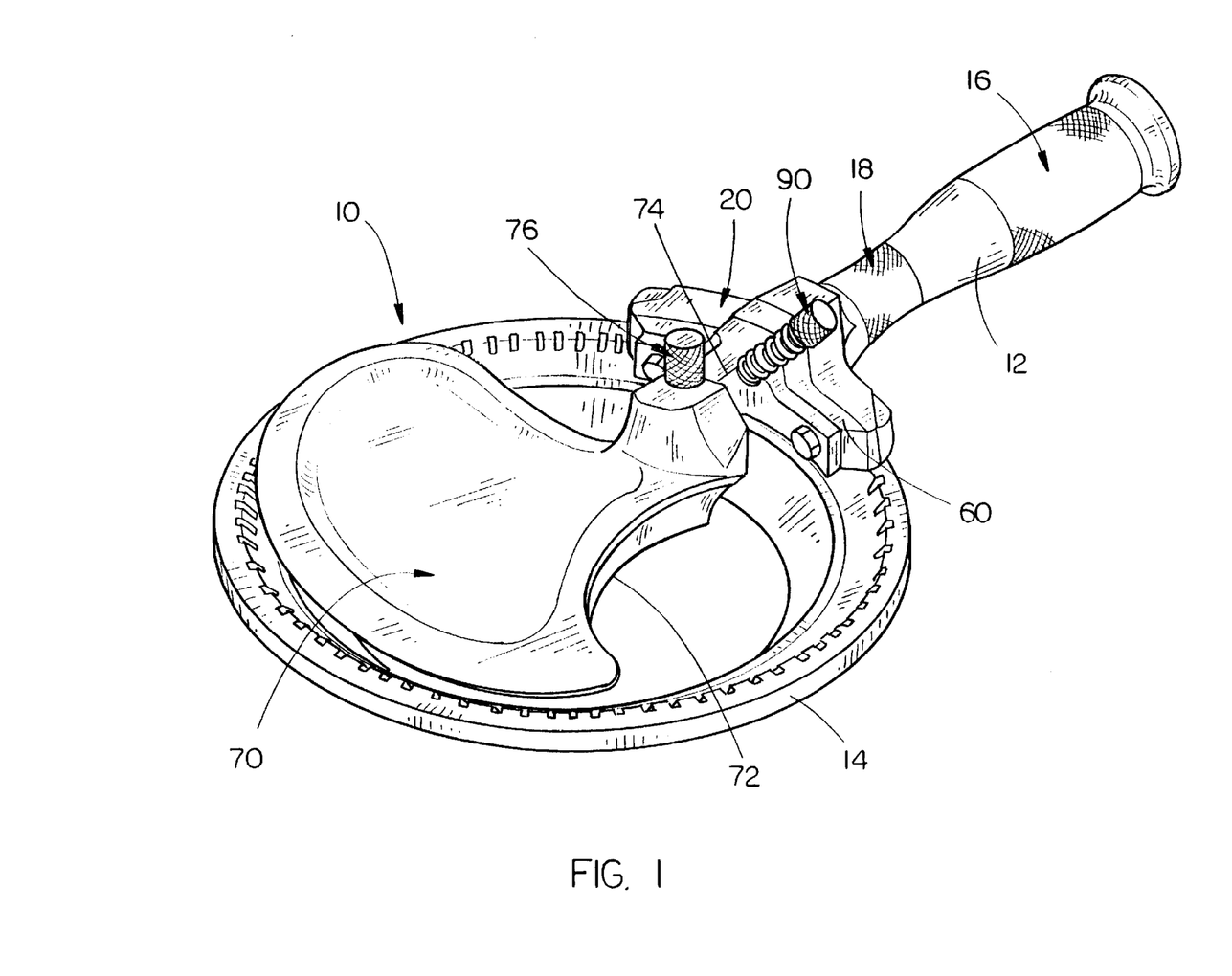
FIG. 1 is a perspective view of the improved boning and defatting rotary knife of the present invention.
Figure 2:
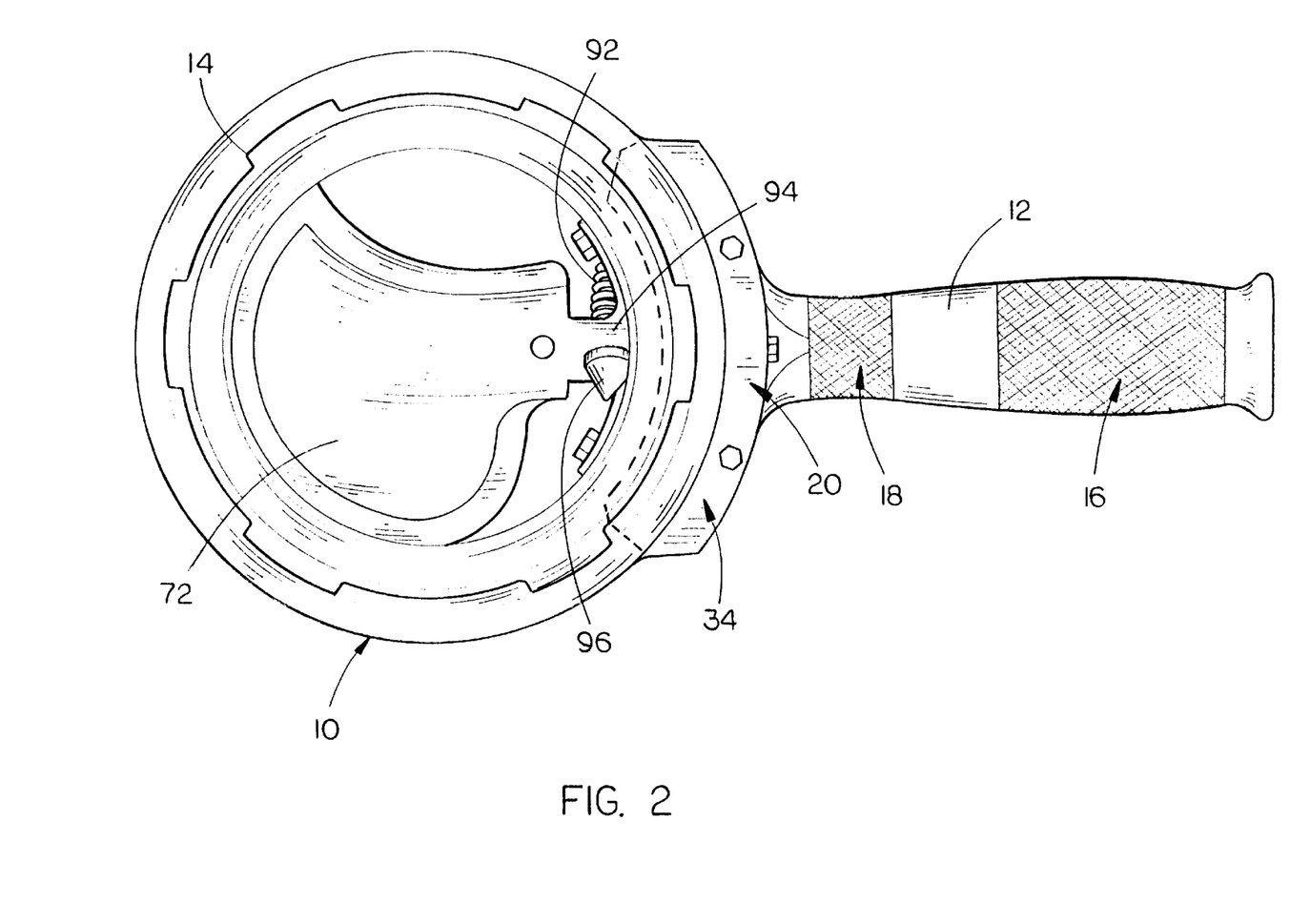
FIG. 2 is a top plan view of the present invention.

The boning and defatting rotary knife 10 of the present invention is best shown in FIGS. 1 and 2 as including a handle portion 12 and a blade support ring 14 from which the handle 12 extends. In the preferred embodiment, the handle 12 would include a generally cylindrical hollow rear handle section 16, a forward generally curved T-shaped ring mount section 20 and a tapered hollow middle section 18 extending between and connecting the rear handle section and the ring mount section 20. It is further preferred that the rear handle section 16 also include roughened grip portions on the external surfaces thereof to facilitate gripping of the handle 12. Of course, modifications to the design of the handle 12 are well within the purview of the present invention, but it has been found that the handle 12 disclosed in FIGS. 1 and 2 is well-suited to the present use. Rotatably mounted within the handle 12 and extending generally parallel therewith is a drive shaft 22 which, in the preferred embodiment, is adapted for connection to a drive device such as a rotating drive cable, compressed air hose or the like. The drive device would be inserted into the rear handle section 16 and moved forwards within the handle 12 until the end of the drive device engages the connection end 24 of the drive shaft 22. Drive shaft 22 is rotatably supported within handle 12 by a bearing sleeve 28 which permits the drive shaft 22 to rotate with greatly reduced noise, friction and vibration, thus increasing the usable lifespan of the drive shaft 22.

Figure 3:
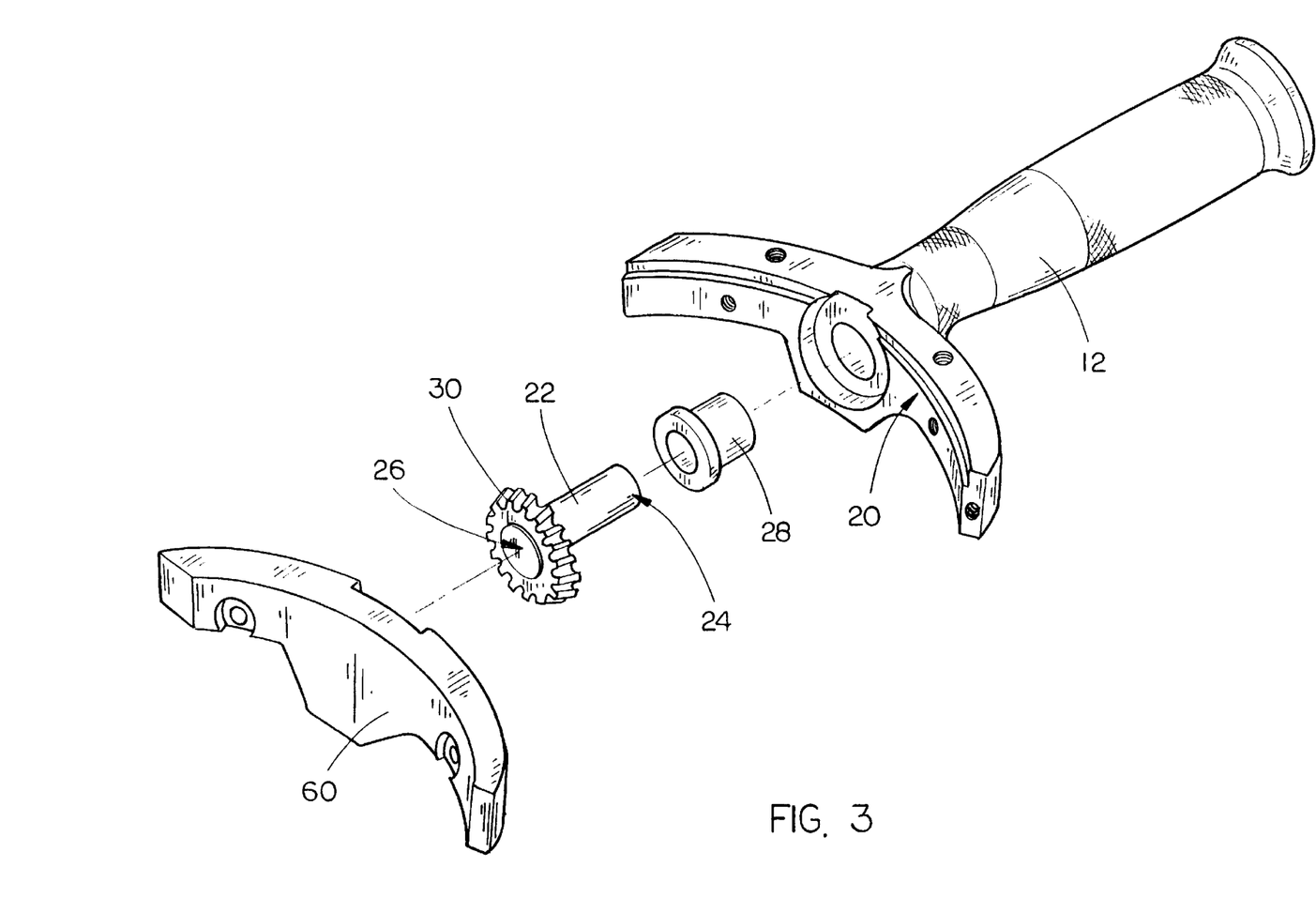
FIG. 3 is an exploded perspective view of the drive device and the ball bearings supporting the drive device.
Figure 4:
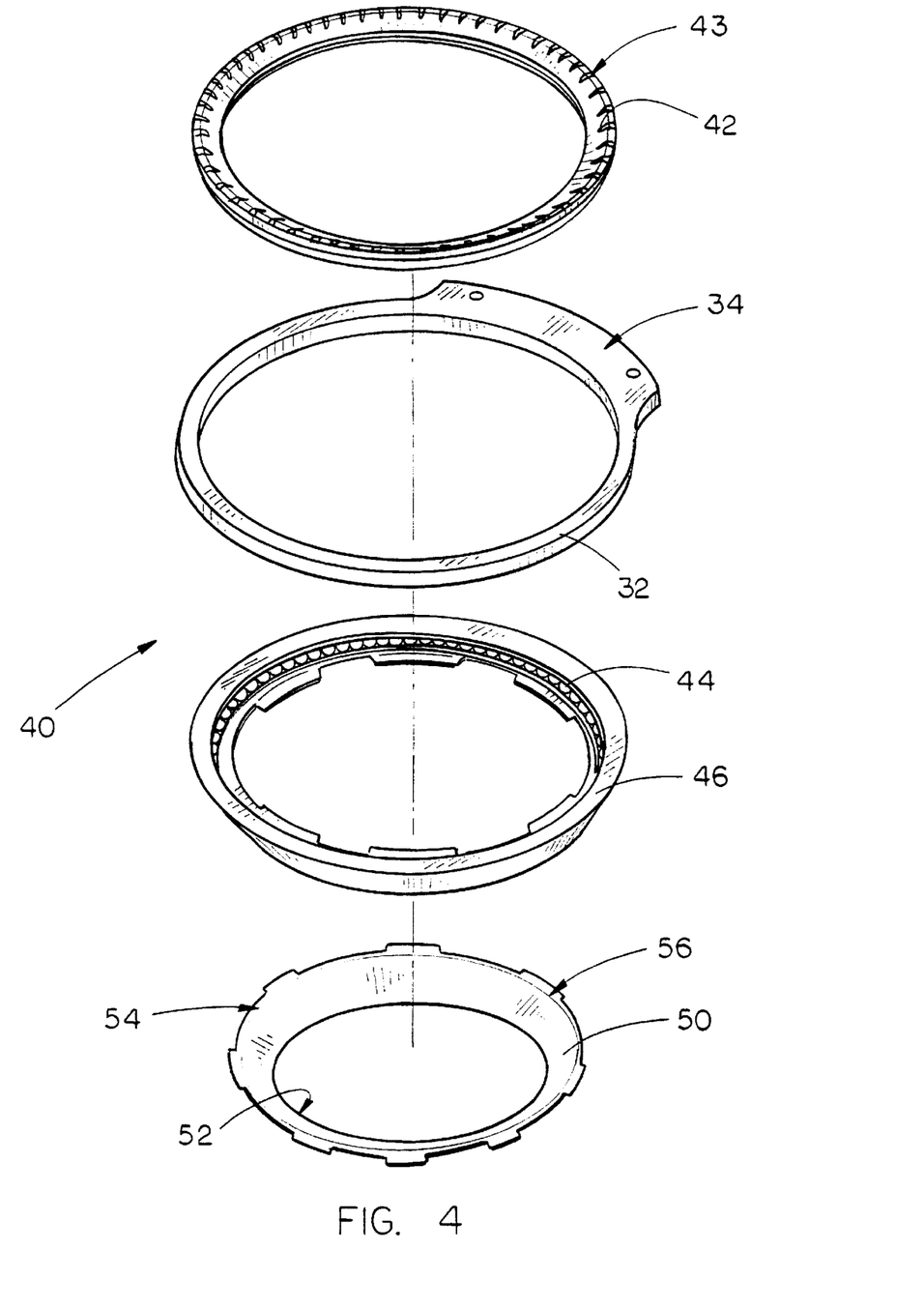
FIG. 4 is an exploded perspective view of the blade holder and blade of the present invention.
Figure 6:
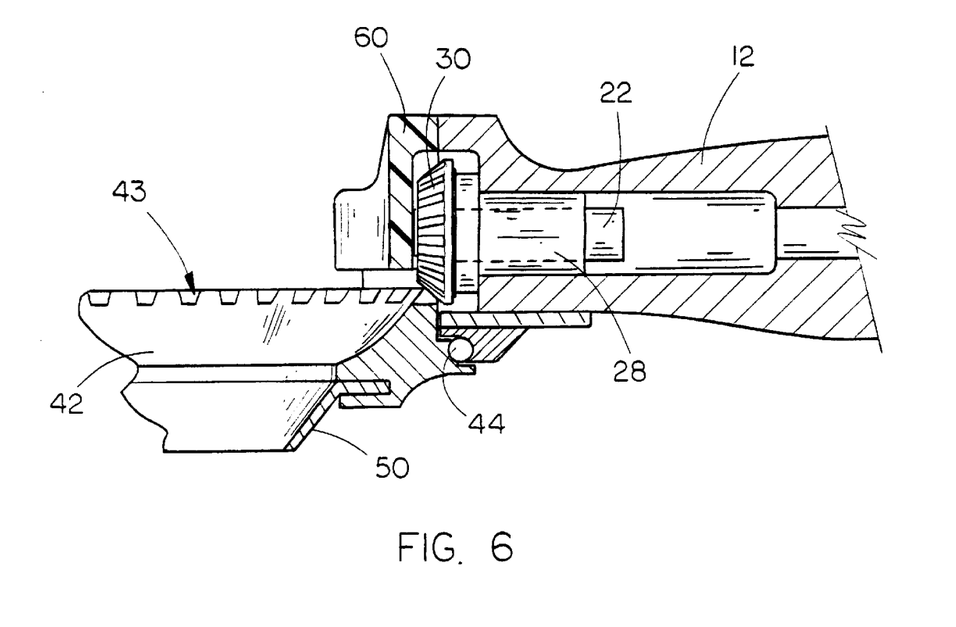
FIG. 6 is a side sectional elevational view of the drive shaft and drive gear of the present invention.

Mounted on the forward end 26 of the drive shaft 22 is a beveled gear 30 which is adapted to intermesh with the blade to rotate the blade within the blade support ring 14. As shown best in FIG. 3, the beveled gear 30 extends beyond the forward face of the ring mount section 20 and is positioned above the blade support ring 14. It is expected that the drive shaft 22 and beveled gear 30 will be constructed of a high-strength steel to ensure longevity in the use of the drive shaft 22 and beveled gear 30. Mounted on the underside of the ring mount section 20 of the handle 12 is the blade support ring 14 which supports the cutting blade unit 40 in the proper cutting plane for use by a user of the rotary knife 10 of the present invention. In the preferred embodiment, the blade support ring 14 includes a circumferential metal ring 32 having an extended rear plate section 34 which is mounted to the underside of ring mount section 20 as shown in FIGS. 4 and 6. In fact, FIG. 4 provides the best disclosure of the elements of the blade support ring 14 and the blade unit 40 and the unique nature of the present invention. A toothed ring 42 is positioned within, extending above and is supported by the circumferential metal ring 32 and positioned between the two is a plurality of ball bearings 44 which permit the toothed ring 42 to rotate relative to the metal ring 32 with greatly reduced friction and vibration. It is a critical feature of the present invention that there be positioned between the metal ring 32 and the toothed ring 42 such a friction-reducing material, which in the preferred embodiment would be the aforementioned ball bearings 44 but could also be a strip of nylon bushing material or another such friction-reducing material, the substitution of which would be known to those skilled in the art. However, the inclusion of any such material is believed to be inventive in nature and is an important feature of the present invention. Of course, it is important that the friction-reducing material be positioned between the metal ring 32 and the blade unit 40 itself, not necessarily only the toothed ring 42, to provide reduction of friction between the metal ring 32 and the blade unit 40.

Positioned beneath the metal ring 32 and connected to the toothed ring 42 is a circular blade fastening and locking ring section 46 which includes at least one blade receiving and locking slot 48 for receiving and securing the toroidal cutting blade 50 therein. As the blade fastening and locking ring 46 is connected directly to the toothed ring 42, the two rings rotate in unison relative to the metal ring 32 and secure the ball bearings 44 therebetween to ensure that the ball bearings 44 remain in friction-reducing position. Of course, the exact sizes and cross-sectional shapes of the rings 32, 42 and 46 are not critical to the present invention so long as the functionality of the present invention is not degraded.

Figures 7, 8:
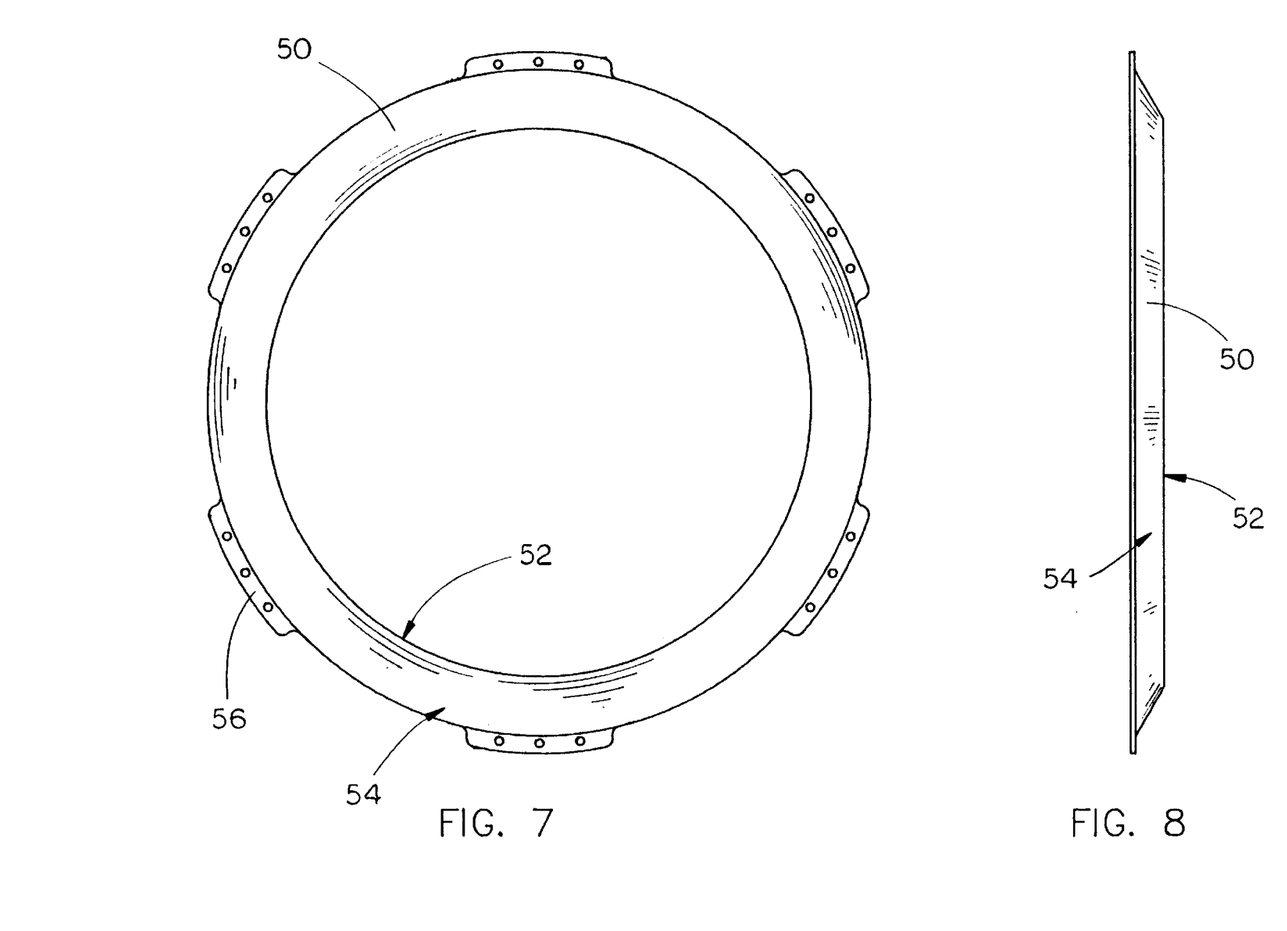
FIGS. 7 and 8 are top plan and side elevational views, respectively, of the interchangeable blade of the present invention.
Figures 9, 10:
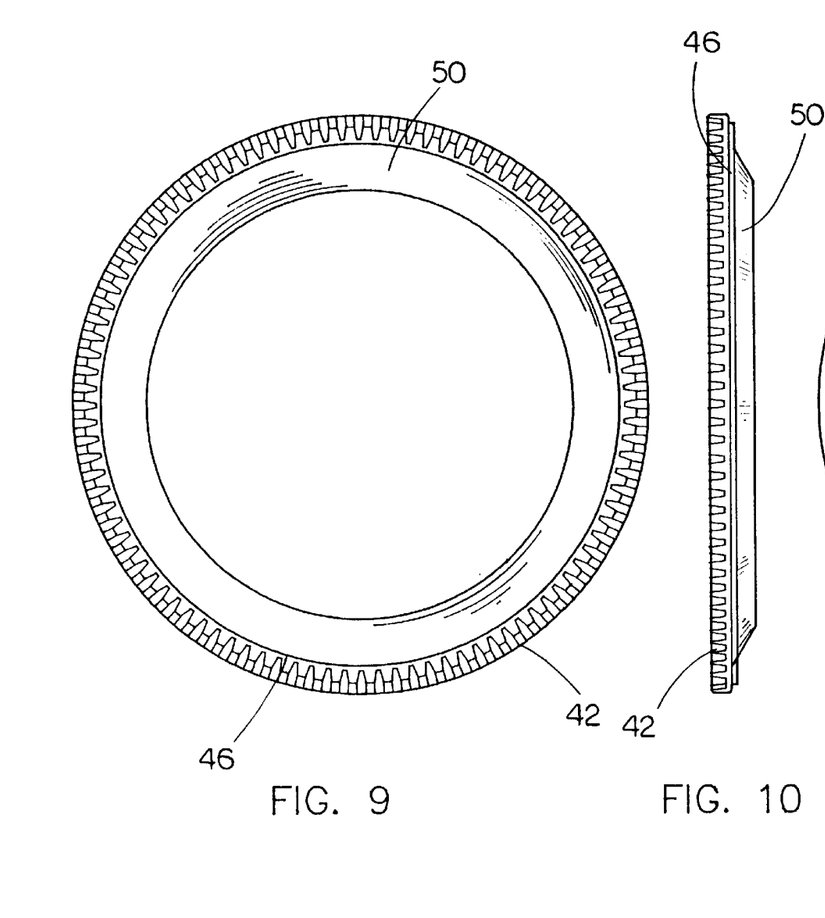
FIGS. 9–11 are detail views of the blade and blade holder of the present invention.

The toroidal blade 50, shown best in FIGS. 7 and 8, would be of the standard type used in the prior art regarding its inner lower cutting edge 52, but one of the important modifications and improvements of the present invention over the prior art resides in the upper section 54 of.the blade 50 which includes a plurality of outwardly extending tabs 56 which are designed to be engaged by the blade receiving and locking slots 48 of the circular blade fastening and locking ring section 46.

Figure 11:
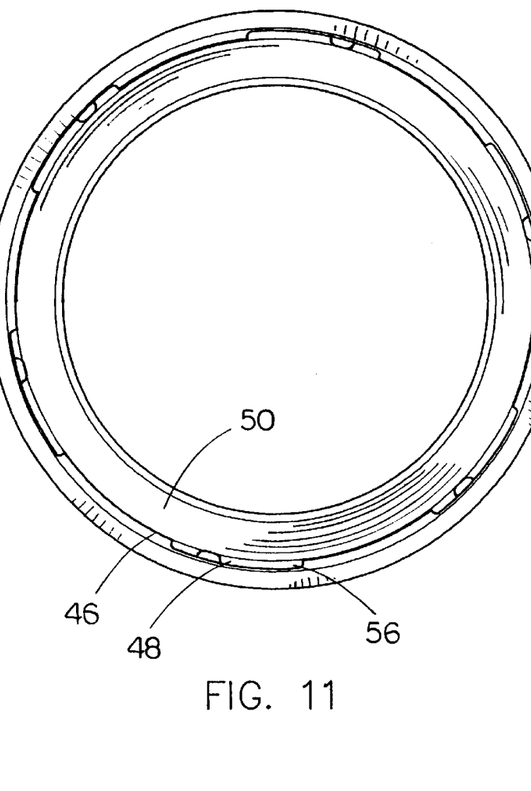
Figure 12:
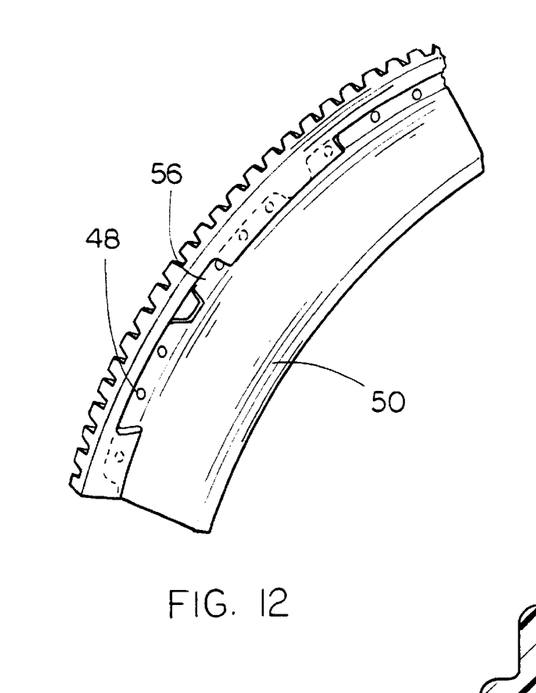
FIGS. 12, 13 and 14 are detail views of an alternative embodiment of the blade mount of the present invention.
Figure 13:
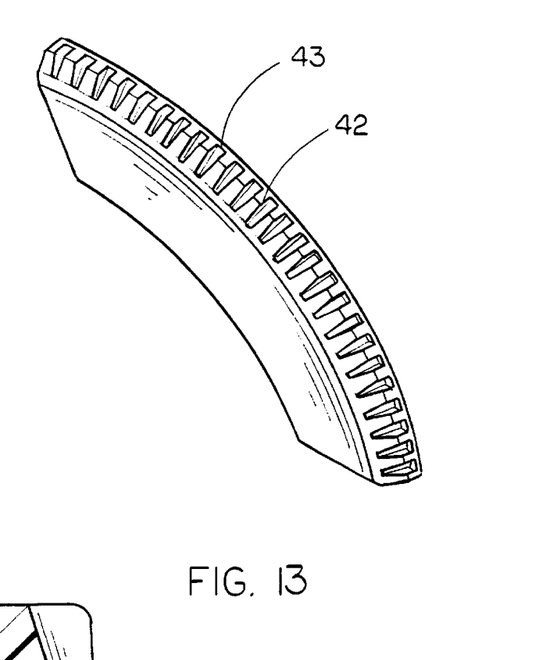
Figure 14:
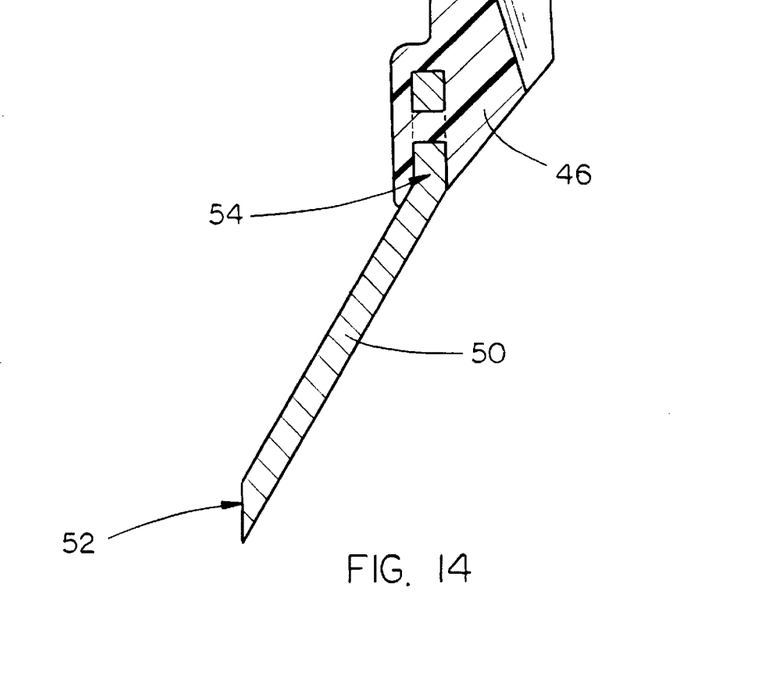

As best shown in FIG. 11, the outwardly extending tabs 56 on the upper section 54 of blade 50 would fit within slots 48 of blade fastening and locking ring 46 and would then be rotated to secure the tabs 56 within those slots 48. The outwardly extending tabs 56 shown on upper section 54 of blade 50 provide the releasable connection between the blade fastening and locking ring 46 and toroidal blade 50, and the torque forces applied to the blade 50 during rotation of the blade in the cutting and defatting of meat products will force the tabs 56 even deeper into the slots 48, thereby increasing the stability of the connection between the toroidal cutting blade 50 and the blade fastening and locking ring 46.

Figure 5:
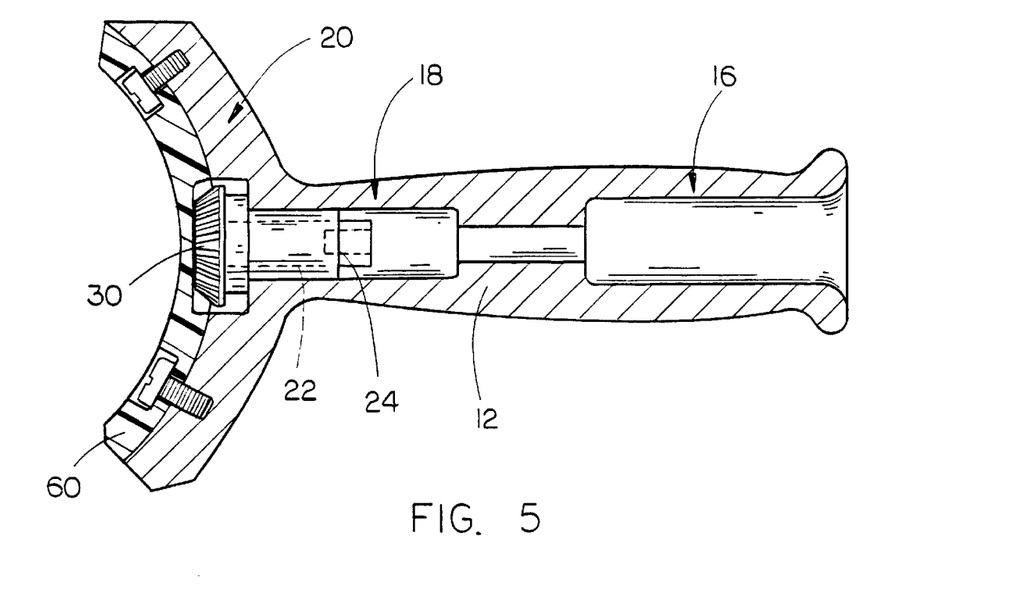
FIG. 5 is a detail top plan view of the drive shaft and drive gear of the present invention.

In the preferred embodiment, it is expected that the toothed ring 42 would be permanently affixed to the blade fastening and locking ring 46 with the metal ring 32 therebetween, thus forming a unitary blade mount piece for attachment to the ring mount section 20 of the handle 12. When the above-described blade mount piece is mounted on the ring mount section 20, the beveled gear 30 mounted on the forward end 26 of drive shaft 22 engages the upwardly projecting gear teeth 43 of toothed ring 42, as shown best in FIGS. 5 and 6, such that rotation of the beveled gear 30 is translated into rotation of the toothed ring 42 and hence rotation of the blade fastening and locking ring 46 and cutting blade 50. To ensure proper intermeshing between the beveled gear 30 and the teeth 43, a gear cover piece 60 is affixed to the front of the ring mount section 20 of handle 12 covering the beveled gear 30 as shown best in FIGS. 1, and 5. The exact size and shape of the gear cover piece 60 is not critical to the present invention so long as the intermeshing of the gear 30 and the teeth 43 is not affected by foreign materials such as meat pieces or other such debris.

The combination of the ball bearings 44 supporting the toothed ring 42 and the bearing sleeve 28 permit the blade 50 to be rotated at a high rate of speed without the noise and vibration produced by the knives of the prior art. Furthermore, the decreased friction of the ring-on-ring contact will increase the usable lifespan of the unit, which is a benefit to the users of such devices.

Two additional features of the present invention which are not critical to the operation of the invention but have been proven to be beneficial are shown in FIGS. 1, and 2 as including a cutting depth adjustment device 70 and a blade sharpening device 90. In the preferred embodiment, the cutting depth adjustment device 70 would include a generally flat plate 72 extending generally parallel with the plane of cutting edge 52 of cutting blade 50, the plate 72 adjustably mounted on one of the handle 12 or the blade support ring 14 via a mount 74 and an adjustment screw 76 which, when rotated, will move the plate 72 upwards or downwards relative to the plane of cutting edge 52. The plate 72 restricts the depth which the knife 10 is permitted to go, although it should be noted that other types of depth control devices can be used with the present invention which will accomplish the same purposes.

The other additional feature is the blade sharpening device 90 which, in the preferred embodiment, is a spring-loaded rod 92 movably mounted on one of the handle 12 or the blade support ring 14 via a mount 94 and having a conic metal sharpening end 96 which can be moved downwards into contact with the cutting edge 52 of the cutting blade 50. As the sharpening end 96 contacts the cutting edge 52, the metal-on-metal contact at the correct angle of the sharpening end 96 with the cutting edge 52 causes the cutting edge 52 to be sharpened. Of course, it is to be noted that numerous other types of sharpening devices may be substituted for the above-described sharpening device which are understood by those skilled in the art of blade sharpening.

It is therefore to be understood that numerous modifications, additions and substitutions may be made to the boning and defatting rotary knife 10 of the present invention which fall within the intended broad scope of the preceding disclosure. For example, the size, shape and dimensions of the boning and defatting rotary knife may be modified or changed to fit various needs in the meat packing industry, as long as the intended function of reducing vibration and reducing noise pollution will be maintained. Also, the exact connection between blade fastening and locking ring 46 and cutting blade 50 may be modified or changed so long as the connection is secure, releasable and prevents accidental dislodging of the blade 50 from blade fastening and locking ring 46. Finally, the remaining described features are not critical to the present invention so long as the releasable connection of the blade to the body is maintained and the friction-reducing material is inserted in between the metal ring 32 and the toothed ring 42 or in whatever form the cutting blade unit 40 is rendered.

There has therefore been shown and described a boning and defatting rotary knife which accomplishes at least all of its intended objectives.

We claim:

1. An improved boning and defatting knife comprising;
    a blade support unit including a handle, a blade support ring connected to and extending from said handle and a drive means mounted on at least one of said handle and said blade support ring; and
    a blade unit including;
        a generally toroidal blade engaging and locking device having a drive means engaging section and a releasable fastening and locking section;
        a generally toroidal blade having an outer locking edge and an inner cutting edge;
        said releasable fastening and locking section of said blade engaging and locking device operative to releasably receive and lock said outer locking edge of said blade thereon, whereby said blade is removable and replaceable; and
        said blade unit being adapted to be removably and rotatably seated on said blade support ring with said drive means engaging said drive means engaging section of said blade unit such that said blade unit is rotated within and on said blade support ring by said drive means.

2. The improved boning and defatting knife of claim 1 further comprising a friction-reducing material mounted between said blade support ring and said blade unit such that said blade unit rotates with reduced friction within said blade support ring.

3. The improved boning and defatting knife of claim 2 wherein said friction-reducing material comprises a plurality of ball bearings mounted between said blade support ring and said blade unit.

4. The improved boning and defatting knife of claim 1 wherein said drive means comprises a drive shaft mounted within said handle and extending forwardly therefrom, said drive shaft adapted for connection to an external drive device, said drive shaft rotatably supported within said handle on a bearing sleeve and a beveled gear mounted on an end of said drive shaft, said beveled gear adapted to intermesh with said blade unit to rotate said generally toroidal blade within said blade unit.

5. The improved boning and defatting knife of claim 1 wherein said blade unit comprises a toothed ring positioned within, extending above and supported by said blade support ring, a generally circular blade fastening and locking ring section including at least one blade receiving and locking slot for receiving and securing said generally toroidal blade and a plurality of ball bearings positioned between said blade unit and said blade support ring thereby permitting said blade unit to rotate relative to said blade support ring with reduced friction and vibration.

6. The improved boning and defatting knife of claim 5 wherein said generally toroidal blade comprises an inner lower cutting edge and an upper section including at least one outwardly extending tab adapted to be engaged and retained by said at least one blade receiving and locking slot of said generally circular blade fastening and locking ring section.

7. The improved boning and defatting knife of claim 1 further comprising a cutting depth adjustment device including a generally flat plate extending generally parallel with the plane of said generally toroidal blade, said plate adjustably mounted on one of said handle and said blade support ring, and an adjustment means operative to move said plate upwards or downwards relative to the plane of said generally toroidal blade thereby restricting the cutting depth of said improved boning and defatting knife.

8. The improved boning and defatting knife of claim 1 further comprising a blade sharpening device comprising a spring-loaded rod movably mounted on one of said handle and said blade support ring generally adjacent said blade unit, said blade sharpening device further including a conic metal sharpening end mounted on said rod such that said sharpening end is movable to contact the cutting edge of said generally toroidal blade whereby as said sharpening end contacts said cutting edge, said cutting edge is sharpened by said sharpening end.

9. An improved boning and defatting knife comprising;
 a blade support unit including a handle, a blade support ring connected to and extending from said handle and a drive means mounted on at least one of said handle and said blade support ring; and
 a blade unit including;
  a generally toroidal blade engaging and locking device having a drive means engaging section and a releasable fastening and locking section;
  a generally toroidal blade having an outer locking edge and an inner cutting edge;
  said releasable fastening and locking section of said blade engaging and locking device operative to releasably receive and lock said outer locking edge of said blade thereon, whereby said blade is removable and replaceable;
  said blade unit being adapted to be removably and rotatably seated on said blade support ring with said drive means engaging said drive means engaging section of said blade unit such that said blade unit is rotated within said blade support ring by said drive means; and
  a friction-reducing material mounted between said blade support ring and said blade unit such that said blade unit rotates with reduced friction within and on said blade support ring.

10. The improved boning and defatting knife of claim 9 wherein said friction-reducing material comprises a plurality of ball bearings mounted between said blade support ring and said blade unit.

11. The improved boning and defatting knife of claim 9 wherein said drive means comprises a drive shaft mounted within said handle and extending forwardly therefrom, said drive shaft adapted for connection to an external drive device, said drive shaft rotatably supported within said handle on a bearing sleeve and a beveled gear mounted on an end of said drive shaft, said beveled gear adapted to intermesh with said blade unit to rotate said generally toroidal blade within said blade unit.

12. The improved boning and defatting knife of claim 9 wherein said blade unit comprises a toothed ring positioned within, extending above and supported by said blade support ring, a generally circular blade fastening and locking ring section including at least one blade receiving and locking slot for receiving and securing said generally toroidal blade and a plurality of ball bearings positioned between said blade unit and said blade support ring thereby permitting said blade unit to rotate relative to said blade support ring with reduced friction and vibration.

13. The improved boning and defatting knife of claim 12 wherein said generally toroidal blade comprises an inner lower cutting edge and an upper section including at least one outwardly extending tab adapted to be engaged and retained by said at least one blade receiving and locking slot of said generally circular blade fastening and locking ring section.

14. The improved boning and defatting knife of claim 9 further comprising a cutting depth adjustment device including a generally flat plate extending generally parallel with the plane of said generally toroidal blade, said plate adjustably mounted on one of said handle and said blade support ring, and an adjustment means operative to move said plate upwards or downwards relative to the plane of said generally toroidal blade thereby restricting the cutting depth of said improved boning and defatting knife.

15. The improved boning and defatting knife of claim 9 further comprising a blade sharpening device comprising a spring-loaded rod movably mounted on one of said handle and said blade support ring generally adjacent said blade unit, said blade sharpening device further including a conic metal sharpening end mounted on said rod such that said sharpening end is movable to contact the cutting edge of said generally toroidal blade whereby as said sharpening end contacts said cutting edge, said cutting edge is sharpened by said sharpening end.

* * * * *